UNITED STATES PATENT OFFICE.

JEHU H. WOOD, OF LEBANON, OHIO.

VULCANIZABLE GILDING-RUBBER.

SPECIFICATION forming part of Letters Patent No. 343,413, dated June 8, 1886.

Application filed February 25, 1886. Serial No. 193,228. (Specimens.)

*To all whom it may concern:*

Be it known that I, JEHU H. WOOD, of Lebanon, in the county of Warren and State of Ohio, have invented a new and Improved Vulcanizable Gilding-Rubber, of which the following is a full, clear, and exact description.

My invention relates to the production of thin sheets of vulcanizable gilding-rubber, designed more especially for use in the manufacture of dental plates, but also applicable to any other uses in the art.

The invention consists, essentially, of a sheet of vulcanizable rubber, to which a coating or coatings of chloride of silver has been applied, and also of the process or method of applying such coating of chloride of silver.

In producing the article forming the subject-matter of this application, I take a sheet of vulcanizable rubber and coat the surface with pulverized chloride of silver, rubbing the said pulverized chloride of silver into the various inequalities which may exist in the surface of the rubber, one or both sides of the rubber being so coated. After the rubber has been coated with chloride of silver, as described, it may in like manner be coated with hydrate of chloride, in order that the gilding-rubber and the plastic vulcanite will not adhere when the two substances are brought together in the vulcanizing-flask.

In forming gold-lined dental plates the gilding-rubber used is as follows: After the case is packed in the ordinary manner, with a cloth over the model, the model and cloth are removed, gold-foil is then put on the model, the gilding-rubber placed over the plastic vulcanite in the flask, the model, with the applied gold-foil, is inserted, and the flask closed and treated in the usual manner, after which it will be found that the gold and newly-formed vulcanite will constitute one integral mass, the chloride having been driven off or having been absorbed by the iron receptacle used in the process described.

I have found in practice that better results are obtained by coating both sides of the gilding-rubber with chloride of silver; but very satisfactory work may be done when one side only of the rubber is so coated.

Having thus fully described my invention, I claim as new and desire to secure by Letters Patent—

1. As a new article of manufacture, vulcanizable material coated with chloride of silver, substantially as described.

2. As a new article of manufacture, vulcanizable gilding-rubber consisting, essentially, of sheet-rubber coated with chloride of silver, substantially as described.

3. As a new article of manufacture, vulcanizable gilding-rubber consisting of sheet-rubber, both sides of which are coated with chloride of silver, substantially as described.

4. The process of forming vulcanizable gilding-rubber herein set forth, which consists in coating vulcanizable rubber with chloride of silver, substantially as described.

JEHU H. WOOD.

Witnesses:
   C. C. DONLEY,
   JASPER M. JOHNSON.